US 6,564,382 B2

(12) United States Patent
Duquesnois et al.

(10) Patent No.: US 6,564,382 B2
(45) Date of Patent: May 13, 2003

(54) METHOD FOR PLAYING MULTIMEDIA APPLICATIONS

(75) Inventors: Laurent Michel Olivier Duquesnois, Paris (FR); Guillaume Brouard, Paris (FR); Thierry Durandy, Issy les Moulineaux (FR); Thierry Planterose, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/929,117

(22) Filed: Aug. 14, 2001

(65) Prior Publication Data

US 2002/0049969 A1 Apr. 25, 2002

(30) Foreign Application Priority Data

Aug. 16, 2000 (EP) .............................................. 00402295

(51) Int. Cl.$^7$ .......................... H04N 7/173; H04N 5/04; H04N 7/12; G06F 9/00
(52) U.S. Cl. ...................... 725/100; 725/131; 348/510; 348/512; 375/240.08; 375/240.28; 709/107
(58) Field of Search ............................ 725/100, 91, 93, 725/97, 131; 375/240.28, 240.26, 204.08; 348/510, 512, 425.4; 345/302; 709/100, 107

(56) References Cited

U.S. PATENT DOCUMENTS 5,959,684 A * 9/1999 Tan et al. .................... 348/500
6,016,166 A * 1/2000 Huang et al. ................ 345/723
6,075,576 A * 6/2000 Tan et al. ................. 348/425.4
6,088,063 A * 7/2000 Shiba ........................ 348/500
6,392,707 B1 * 5/2002 Cooper et al. .............. 348/512

FOREIGN PATENT DOCUMENTS

| EP | 0817103 | 1/1998 | .......... G06F/17/30 |
| WO | WO9836559 | 2/1998 | .......... H04N/5/262 |
| WO | WO 98/36559 | * 8/1998 | .................... 5/262 |
| WO | WO0001154 | 6/1999 | ............ H04N/7/26 |

OTHER PUBLICATIONS

F. Casalino et al, "MPEG–4 Systems, Concepts and Imlementation", Lecture Notes in Computer Science, Springer Verlag, NY, US, pp. 504–517, XP002120937.

* cited by examiner

Primary Examiner—John Miller
Assistant Examiner—Johnny Ma
(74) Attorney, Agent, or Firm—Russell Gross

(57) ABSTRACT

The present invention relates to a method of playing a set of multimedia applications (A), each multimedia application including a list of tasks (TTD). The method includes the steps of creating a common scheduler (SCH) at a start time, in order to provide a target time, registering the tasks into the scheduler, and controlling the execution of the tasks as a function of the target time. The method also includes a step of giving a priority level to the task and the scheduler is adapted to control the execution of the tasks as a function of the target time and the priority level. The method further includes a step of computing a local time for a task from the target time provided by the scheduler and timing information associated with said task. With such a mechanism, each task has its own time reference, thus ensuring a correct operation of the overall application, while a global notion of schedule is maintained.

7 Claims, 2 Drawing Sheets

METHOD FOR PLAYING MULTIMEDIA APPLICATIONS

FIELD OF THE INVENTION

The present invention relates to a method of playing a set of multimedia applications.

Such a method may be used in, for example, a computer via a browser providing access to MPEG audio and video data over an internet-type distribution system.

BACKGROUND OF THE INVENTION

An audio-video player is a program running on a computer that decodes audio and video streams in order to produce an audio-visual presentation. FIG. 1 is a block diagram of a method of playing audio and video frames in accordance with the prior art. Said method plays MPEG-4 data and comprises a demultiplexing step (DEMUX) for splitting an MPEG-4 encoded data stream (IS) into an audio stream (AS) and several video streams (VS1 to VSn). Such a method comprises three main tasks.

It firstly comprises an audio decoding and rendering task (DR). This task decodes an audio stream (AS) and drives the sound rendering system by providing decoded audio samples to sound system hardware. The sound system hardware converts these digital audio samples into an analog sound signal (SO), which is sent to loudspeakers (LS).

It also comprises a video decoding task (DEC). This task decodes at least one video stream (VS) and stores the decoded video frames in a video frame buffer (BUF).

Finally, it comprises a video rendering task (REN). This task takes the decoded video frames (VF) from the video frame buffer and supplies pixels corresponding to the decoded video frames to video system hardware in order to compose a video scene (SC). The video rendering step also performs all the video frame conversions which are necessary to drive a monitor (MON).

The European patent application n°0 817 103 describes a method and system for providing access to multimedia content data on an internet-type distribution system. Such a method allows to play multimedia data according to the above description, using a web browser, the audio and video playback being performed on separate threads of control.

SUMMARY OF THE INVENTION

It is an object of the invention to provide a method of playing a set of multimedia applications, which allows a better synchronization and real-time playing of audio and video frames. The present invention takes the following aspect into consideration.

In the method according to the prior art, each multimedia application contains its own scheduler, and runs it in its own thread. So, even if all application-intrinsic tasks are synchronized, the overall application is not necessarily synchronized. In the example of the integration of a multimedia player in a web browser, each application has its own scheduler and the multimedia player can decode and give to the browser a ready-to-show frame faster than the browser can possibly display. But there is no need to decode 25 frames of a video sequence per second if the browser can display only 10 frames per second. In the same manner, the multimedia player does not need to render at 25 frames per second if the central processing unit, hereinafter referred to as CPU, cannot handle the decoding of more than 10 frames per second.

To overcome the limitations of the prior art, the method of playing a set of multimedia applications in accordance with the invention is characterized in that it comprises the steps of:

creating a common scheduler at a start time in order to provide a target time, registering the tasks into the common scheduler, and controlling the execution of the tasks as a function of the target time.

The use of a common scheduler, contrary to generic scheduling strategies such as the ones implemented in operating system kernels, allows the overall application to remain synchronized while having real time playing.

Moreover, the method of playing a set of multimedia applications in accordance with the invention is characterized in that it further comprises a step of computing a local time for a task from the target time provided by the scheduler and timing information associated with said task.

Such a method ensures a correct operation of the overall application. For that purpose, three specific embodiments are proposed.

In the first one, the method of playing a set of multimedia applications is characterized in that the computing step comprises the sub-steps of determining a start time offset associated with a task from a difference between a start time of the task and the scheduler start time, and calculating the local time from a difference between the target time and the start time offset. For example, when a video sequence is being played, a video decoding task should need to know the target time in order to decode the correct frame. However, the decoding task will first try to decode the frame corresponding to the target time, and will not succeed in this, because the target time is not zero seconds. That is why the method in accordance with the invention computes a local time for this task, thus ensuring a proper video decoding in the context of a common scheduler.

In the second embodiment, the method of playing a set of multimedia applications is characterized in that the task is comprised in a multimedia application coming from an external source, and the computing step comprises the sub-steps of determining an external time offset of the external multimedia application from a difference between the scheduler start time and a start time of the external multimedia application, and calculating the local time from a sum of the target time and the external time offset. As a consequence, the method allows digital encoded data streams to be read from local storage or to be received from a broadcast or network.

In the third embodiment, the method of playing a set of multimedia applications is characterized in that the task is applied to a time limited data stream and the computing step comprises the sub-steps of determining a duration of the data stream, incrementing a counter each time the data stream is finished, and calculating the local time from a difference between the target time and a product of the duration and the counter. As a consequence, the local time varies from zero to the duration of the data stream and the method allows to loop on said data stream.

These and other aspects of the invention will be apparent from and elucidated with reference to the embodiments described hereinafter.

BRIEF DESCRIPTION OF THE DRAWINGS

The present invention will now be described, by way of example, with reference to the accompanying drawings, wherein.

DETAILED DESCRIPTION OF THE INVENTION

Figure 2:
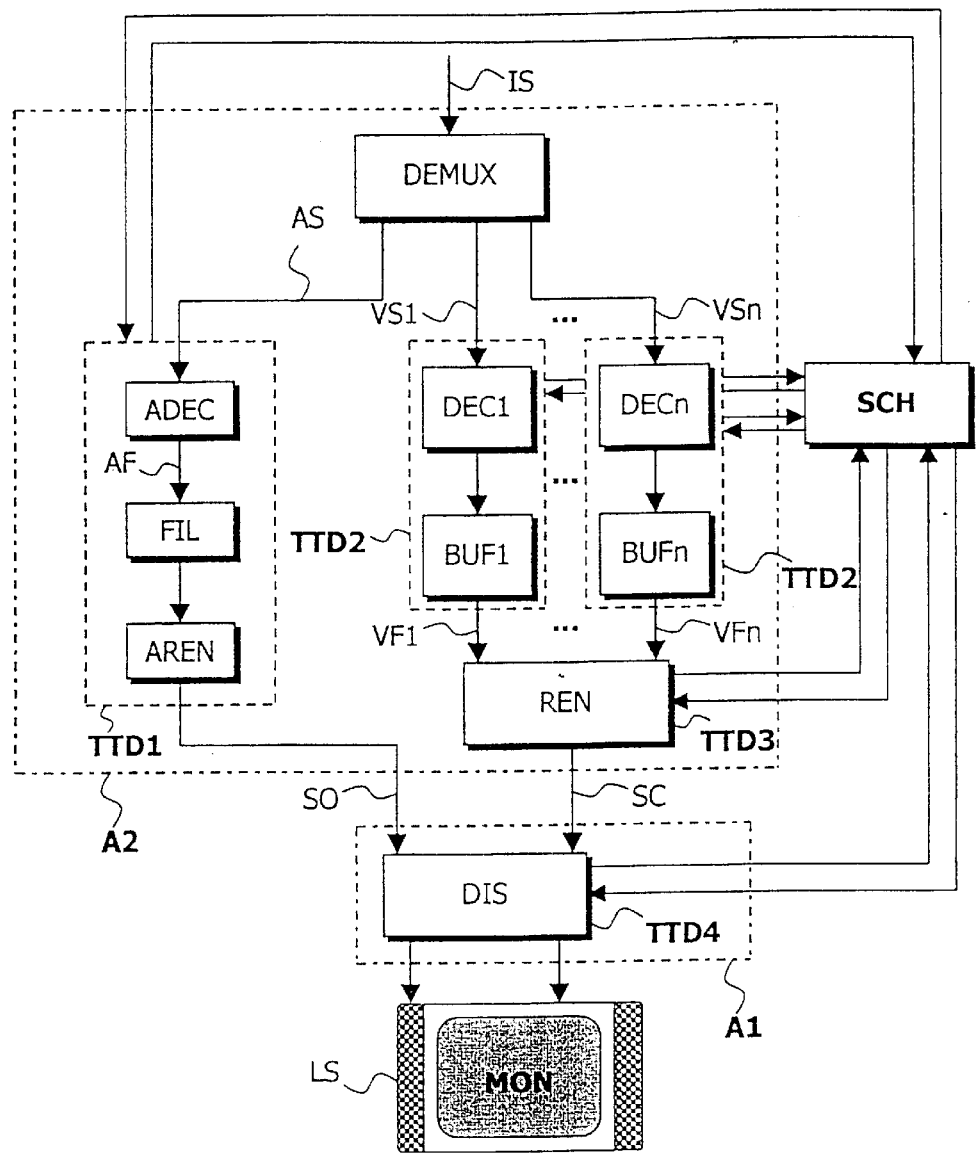
FIG. 2 is a block diagram of a method of playing a set of multimedia applications in accordance with the invention.

The present invention relates to a method of playing a set of multimedia applications. In the preferred embodiment, a main application is a VRML browser (A1) into which is integrated at least a second application, which is a multimedia player (A2), the overall application providing a generic and easy to use mechanism for accurate task scheduling. FIG. 2 is a block diagram of the overall application, which processes a digital encoded data stream (IS) in order to supply audio and video signals (SO, SC) to an audiovisual reproduction system (LS, MON).

In the preferred embodiment, the multimedia player is an MPEG-4 player and first of all comprises a demultiplexer (DEMUX) for splitting the digital encoded data stream into an audio stream (AS) and several video streams (VS1 to VSn).

The MPEG-4 player also comprises the following tasks:
- a first type of task (TTD1) of audio decoding and rendering, to decode (ADEC) the audio stream, to filter (FIL) the decoded audio frames (AF) provided by the decoding, and to render (AREN) said audio frames,
- a second type of task (TTD2) of decoding (DEC) the video streams, to provide video objects, whose decoded video frames (VF1 to VFn) are stored in video buffers (BUF1 to BUFn), a video decoding task being associated with each video stream, and
- a third type of task (TTD3) of rendering and presenting (REN) the decoded video frames stored in the video buffers.

The VRML browser comprises a fourth type of task (TTD4) of updating the reproduction (DIS) of audio and video frames on a screen, which consists in receiving the audio and video frames provided by the third task, rendering and presenting them on a two-dimensional object and then doing the mapping of the two-dimensional object on a three-dimensional object.

It should be noted that there are as many MPEG-4 players as there are MovieTexture nodes, which are VRML nodes that play video sequences.

Finally, the overall application comprises a scheduler for registering the previous tasks, assigning a target time to said tasks, and controlling the execution of the tasks as a function of the target time.

First of all, a scheduler is defined as a software module in which tasks can be registered. Once a task has been registered, the scheduler ensures that said task is executed at the right time. The scheduler is initialized with a scheduling periodicity. For example, for a 25 frames per second video sequence, the periodicity is 40 milliseconds. The scheduler manages a loop on the tasks: it executes each task in the list of registered tasks, one after the other. A task is executed by calling its execution routine.

One major role of the scheduler is to maintain the target time. The target time is computed by the scheduler using the system clock. For example, if the video sequence has started at 12:45:33, the media time is 22 seconds after 22 seconds of playing and is computed from the system clock which is then 12:45:55. The scheduler ensures that the video and audio decoding executed at that time correspond to data in the digital encoded data stream having a media time of 22 seconds.

An aim of the scheduler is to make sure that the player does not run too fast and is friendly to the browser and the other tasks and programs. For that reason, the scheduler computes at the end of each loop the effective time that has elapsed for its execution and compares it with the scheduling periodicity. If the execution of this loop takes less than the scheduling periodicity, the scheduler will call an operating system sleep for the time difference, thus effectively ensuring that, firstly, the player does not run too fast and, secondly, the player is friendly to other tasks or applications since a sleep call to the operating system results in the operating system kernel swapping to other tasks and applications.

Another aim of the scheduler is to make sure that the player does not run too slowly. For this reason the scheduler assigns the target time to each task execution routine. Each task then knows what to do for that time.

In the prior art, each video sequence has its own scheduler and runs it in its own thread. The decoder gives decoded video frames to the rendering and presenting task. Said task recomposes the MPEG-4 scene and places it in a ready-to-show frame called DirectDrawSurface. The rendering and presenting task is also in charge of the display.

This is not the case with the present application where the browser can start two different video sequences at two different times. In that case, the video rendering and presenting task only gives a DirectDraw surface, and the browser's rendering task performs the mapping on three-dimensional objects.

The method of playing a set of multimedia applications in accordance with the invention shares a common scheduler. Before any other initialization, an empty scheduler is created with a period of 40 milliseconds, corresponding to a 25 frames per second video sequence. Then a task corresponding to the VRML browser's main loop is created and inserted into the scheduler list of tasks. When an MPEG-4 video sequence corresponding to a MovieTexture node starts, the required tasks, which are the video decoding, the video rendering and presenting and the audio decoding and rendering tasks, are inserted into the scheduler.

When the difference between the previous target time and the new one becomes larger than a given threshold, the task will reduce the amount of processing it will perform so as to allow the overall application to restore synchronization. To this end, the method of playing a set of multimedia applications further comprises a step of giving a priority level to a task and the scheduler controls the execution of the tasks as a function of the target time and the priority level of said task.

In the preferred embodiment, four specific CPU scalability mechanisms are implemented. The highest priority level is given to the audio decoding and rendering task, then to the video decoding task, then to the video rendering task and finally the lowest priority level is given to the browser display updating task itself.

The first mechanism to keep the player synchronized, is to skip the update of the browser display itself when the CPU is too busy.

The second mechanism to keep the player synchronized, is to skip rendering frames when the CPU is too busy. With the above-described scheduler, this is implemented as follows: when the video rendering task (REN) receives an execution call with a target time, it addresses the video frame buffer (BUF) to find the video frame (VF) closest to this target time. Then the video rendering task displays only that frame and returns. The resulting effect of this algorithm is the following: if there are not enough CPU cycles, an original video sequence at 25 frames per second will be rendered at a lower frame rate, for example 12 frames per seconds. It is a very efficient mechanism that allows the MPEG-4 player to run on machines that would otherwise not be powerful enough. It also makes it possible to run other applications at the same time. What the user sees is only that if the CPU is very busy, the video frame rate will be lower.

The third CPU scalability mechanism consists in skipping video decoding when the first mechanism was not enough to keep pace with real time. However, MPEG-4 video decoding and, more generally, most other video encoding schemes, cannot be resumed at any point in the digital encoded data stream. This is due to the fact that the video encoding algorithm extracts time redundancies between adjacent frames in order to improve encoding efficiency. These frames are called predicted or P frames: the encoder only sends the difference between the current frame and the previous one. In that case, the previous frame must have been decoded. The video standard also normalizes another kind of frames called Intra coded or I frames which can be decoded alone. These frames are random access points, which are points in the digital encoded data stream where decoding can start. Therefore, when the video decoding task (DEC) decides to skip decoding, the video display freezes the last picture until the target time corresponding to a random access point is reached. A video sequence is typically encoded with an I frame every second. As a consequence, the scheduler stops the video decoding and resumes it depending on the amount of CPU cycles available, which is equivalent to an extreme reduction of the video frame rate. Since the video freeze is rather confusing for the user, this strategy is used only when the first CPU mechanism fails to help the player keeping pace with real time. Since the scheduler loops rapidly on the three major tasks, typically at the video frame rate, audio data should be synchronous with video data.

The fourth mechanism consists in skipping audio decoding if the two previous mechanisms were not enough to keep pace with real time. Such a mechanism causes a silence. That is why suitable filters (FIL) are applied to prevent a scratching noise at the beginning and end of this unnatural silence. The audio decoding task (ADEC) has to effectively produce the sound samples corresponding to this silence. In that case, the target time provided by the scheduler (SCH) is used to compute the exact length of this silence so that, when the CPU is less busy, normal playing can be resumed with accurate synchronization of audio and video frames. Fortunately, audio encoding algorithms are such that the random access point periodicity is much smaller than for video encoding. It is usually in the range of a few milliseconds. Therefore, normal audio decoding can be resumed immediately. Since audio decoding is usually less CPU-intensive than video decoding, this typically happens only when the computer is extremely busy with time-critical tasks or when the user has started many CPU-intensive applications.

So with this new approach, there is only a common scheduler, shared between both a VRML browser and at least one MPEG-4 player, and a common time thread is shared.

The method of playing a set of multimedia applications further comprises a step of a computing a local time for a task from the target time provided by the scheduler and timing information associated with said task.

When a movie is being played, the corresponding decoder needs to know the target time in order to decode the correct frame. The problem is that if a user wants to start a video sequence 20 seconds after the browser's main start, the decoder will try to decode the frame corresponding to the target time, which is 20 seconds and not 0 second.

To solve this problem, the local time is computed from the difference between a start time offset and the target time:

local time=target time−start time offset.

The start time offset is computed from the difference between a start time of the task and the scheduler start time:

start time offset=task start time−scheduler start time.

When the task must be executed, it computes said local time for its execution routine, and thus has its own time reference. As a consequence, the target time provided by the scheduler is not modified for the other tasks.

With such a mechanism, each task has its own time reference consistent with the video sequence to be played and still has a global notion of schedule.

The method in accordance with the invention allows the digital encoded data streams to be read from a local storage but should also allow reception from a broadcast or network.

Figure 1:
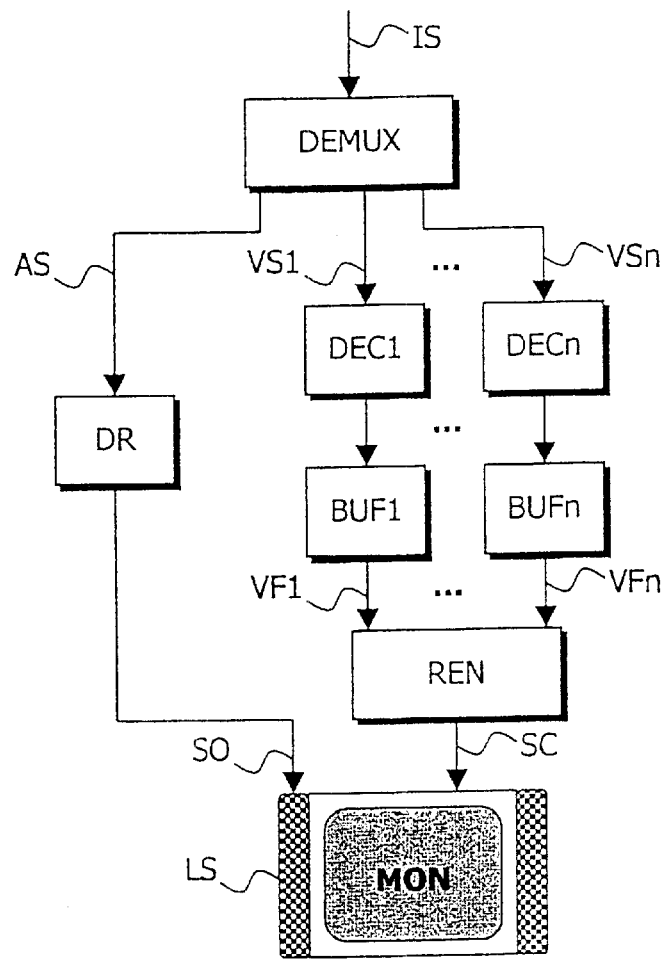
FIG. 1 is a block diagram of a method of playing a set of multimedia applications in accordance with the prior art.
Figure 3:
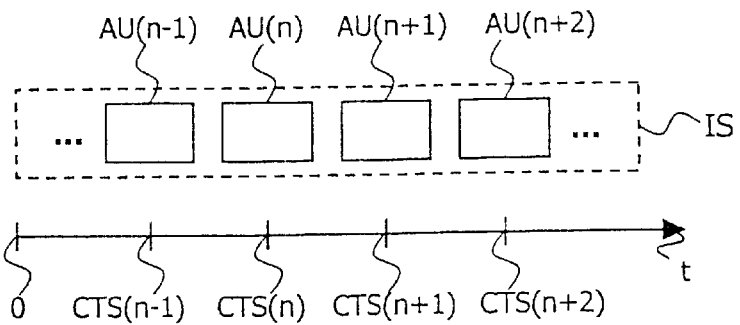
FIG. 3 shows the structure of an MPEG-4 data stream.

To this end, both an MPEG-4 file and an MPEG-4 data stream (IS) coming from the network are considered as a producers of access units (AU) as shown in FIG. 3. This abstraction layer allows the design of a player that reads and decodes access units regardless of the MPEG-4 type of source.

At the encoder side, each access unit is given its own composition time stamp (CTS), starting at zero for the first one and being incremented according to the time (t), in milliseconds, at which it has been packed. These composition time stamps provide the decoder with a notion of time, thus indicating to the decoder if it decodes too fast or too slowly.

The current composition stamp is consistent with the decoder clock. Unfortunately, CPU load, network delay or other matters can produce a lag between the decoder and the current access unit to be decoded. In that case, the decoder may have to skip some access units, i.e. to jump into the future, in order to stay up to date.

For example, if an MPEG-4 webcam video server starts somewhere on the network at 12:00 PM, a real time encoder produces access units with incrementing composition time stamps starting at 0. Now, if the main application with a webcam client starts at 12:00+10200 milliseconds, a player will try to decode the access unit with a composition time stamp equal to 0, which is impossible, because in the present example access units with composition time stamps in the range of 0 to 10180 milliseconds are not available.

To avoid that the decoder searches for an access unit which is not available, an external time offset is added to the time line of the decoder, said offset corresponding to the composition time stamps of the first access unit received, i.e. 10200 milliseconds in the present example. As a consequence, the decoding time reference is equal to the target time provided by the scheduler plus the external time offset:

local time=target time+external time offset.

In a common scheduler context, the time line is unique and shared by all tasks. The scheduler rules time-sharing for the whole application and thus it has to start before anything else. The time line starts at 0 millisecond and can not be changed according to a particular task because this would affect all the other tasks. Reporting the time offset to the task itself instead of to the scheduler, according to the composition time stamp of the first access unit received, makes it possible to allow for a time shift between two independent applications which must be synchronized without the common scheduler being affected.

The method of playing a set of multimedia applications in accordance with the invention can also be applied to a time-limited data stream. It is especially useful when no thread can be suspended until the end of the overall application. In these conditions, a problem appears when a video decoding task is supposed to loop on the input data stream, because the times given by the scheduler and an access unit of the data stream become unsynchronized.

The solution consists in changing the time passed to the MPEG-4 video decoding task but owned by the scheduler. The time has to be reset when the end of the data stream is reached. The first time it happens, the data stream duration is stored and a counter, initialized to zero, is incremented every time the end of the data stream is reached. Then, a local time is computed as follows inside the MPEG-4 video decoding task:

local time=target time−(data stream duration×counter).

The target time varies from zero to infinite, but the local time varies from zero to data stream duration and is reset each time the end of the data stream is reached. The MPEG-4 video decoding task is then able to loop on the data stream.

In some cases, both types of offsets are applicable and cumulative. For example, let it be assumed that a webcam server starts at 12:00, the main application starts at 12:10, and the video decoding task starts at 12:12. In that case, the local time is computed as follows:

local time=target time−start time offset+external time offset.

It should be noted that the method in accordance with the invention can be extended to any set of multimedia applications for which tasks comprised in said applications treat time-indexed data.

This method has been described for application to MPEG-4 data, for which the decoding complexity is extremely variable so that the CPU load has to be managed carefully, so as to avoid CPU cycle waste. However, it is also applicable to other coding techniques which provide multimedia data.

The drawing of FIG. 2 is very diagrammatic and represents only one possible embodiment of the invention. Thus, although this drawing shows different functions as different blocks, this by no means excludes the possibility that a single software item carries out several functions. Nor does it exclude the possibility that an assembly of software item carries out a function. Other applications or tasks than the ones cited above are also possible without departing from of the scope of the invention.

The method in accordance with the invention can be implemented in an integrated circuit, which is to be integrated into a set-top-box or a computer. A set of instructions that is loaded into a program memory causes the integrated circuit to carry out said method. The set of instructions may be stored on a data carrier such as, for example, a disk. The set of instructions can be read from the data carrier so as to load it into the program memory of the integrated circuit which will then fulfil its role.

It will be obvious that the use of the verb "to comprise" and its conjugations does not exclude the presence of any other steps or elements than those defined in any claim. Any reference sign in the following claims should not be construed as limiting the claim.

What is claimed is:

1. A method of playing a set of multimedia applications (A), each multimedia application comprising a list of tasks (TTD), said method comprises the steps of:

creating a common scheduler (SCH) at a start time in order to provide a target time, registering the tasks into the common scheduler, determining a start time offset associated with a task from a difference between a start time of the task and the scheduler start time, and calculating the local time from a difference between the target time and the start time offset, and executing the task according to the local time.

2. A method of playing a set of multimedia applications as claimed in claim 1, characterized in that it further comprises a step of assigning a priority level to a task, and the scheduler is adapted to control the execution of the tasks as a function of the target time and the priority level.

3. Method of playing a set of multimedia applications as claimed in claim 2, characterized in that one of the multimedia applications is an audio-visual application comprising:

a task of audio decoding and rendering (DR) to decode (ADEC) an audio stream (AS) contained in the digital encoded data stream and to render (AREN) the decoded audio frames (AF) provided by the decoding, at least one task of decoding (DEC) a video stream (VS) contained in the digital encoded data stream, to supply a decoded video frame (VF) to a video buffer (BUF), and a task of rendering (REN) the decoded video frames stored in the video buffer, and another application is a browser comprising the task of reproducing (DIS) the audio and video frames on an audio-visual reproduction system, the tasks being cited according to their priority level and the highest priority level being given to the audio decoding and rendering task.

4. A computer program product for a set-top-box, comprising a set of instructions which, when loaded into said set-top-box, causes the set top box to carry out the method as claimed in claim 1.

5. A computer program product for a computer, comprising a set of instructions which, when loaded into said computer, causes the computer to carry out the method as claimed in claim 1.

6. A method of playing a set of multimedia applications, each multimedia application comprising a list of tasks (TTD), said method comprises the steps of:

creating a common scheduler (SCH) at a start time in order to provide a target time, registering the tasks into the common scheduler, determining an external time offset of an external multimedia application from a difference between the scheduler start time and a start time of the external multimedia application, calculating the local time from a sum of the target time and the external time offset, and executing a task included in the external multimedia application according to the local time.

7. A method of playing a set of multimedia applications, each multimedia application comprising a list of tasks (TTD), said method comprises the steps of:

creating a common scheduler (SCH) at a start time in order to provide a target time,
registering the tasks into the common scheduler,
determining a duration of a data stream,
incrementing a counter each time the data stream is finished,
calculating the local time from a difference between the target time and a product of the duration and the counter, and
executing a task applied to the data stream according to the local time.

* * * * *